F. SEDER.
CUSPIDOR.
APPLICATION FILED JUNE 16, 1921.
1,398,118.
Patented Nov. 22, 1921.
2 SHEETS—SHEET 1.
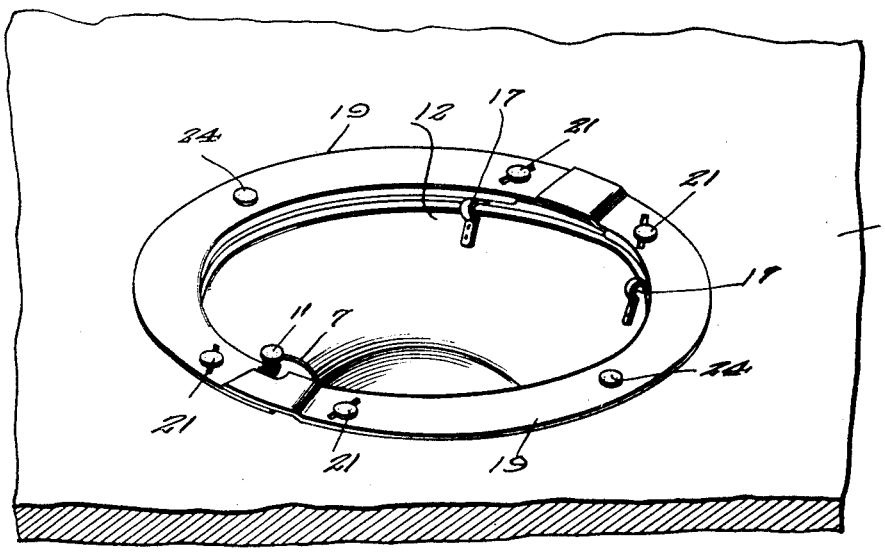
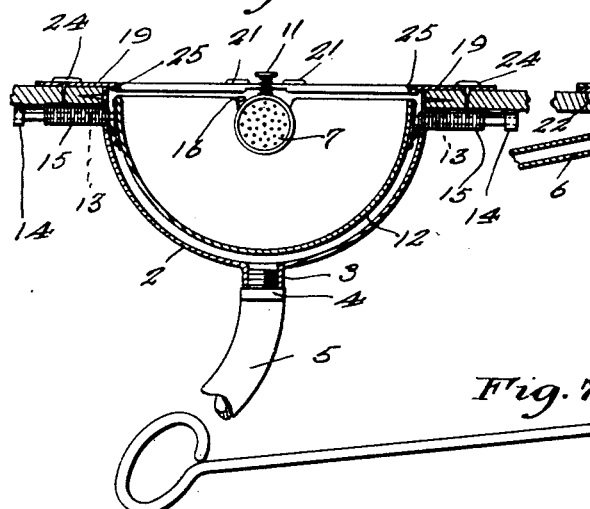
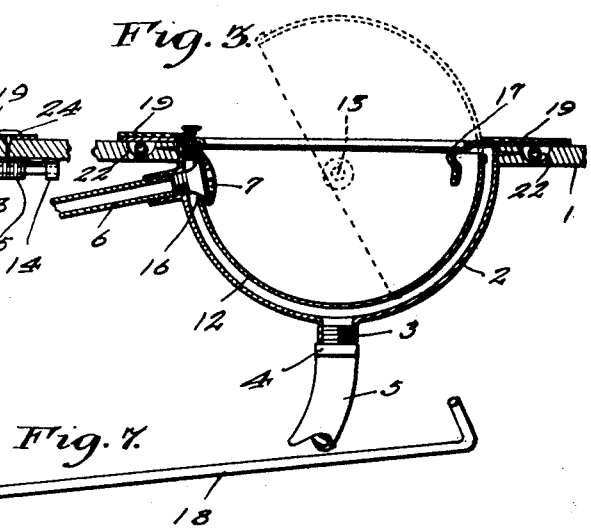
Frank Seder
INVENTOR
BY *Victor J. Evans*
ATTORNEY F. SEDER.
CUSPIDOR.
APPLICATION FILED JUNE 16, 1921.
1,398,118.
Patented Nov. 22, 1921.
2 SHEETS—SHEET 2.
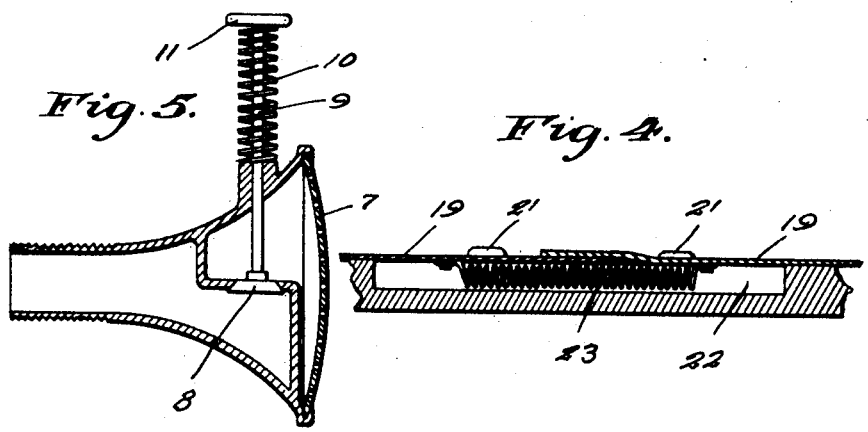
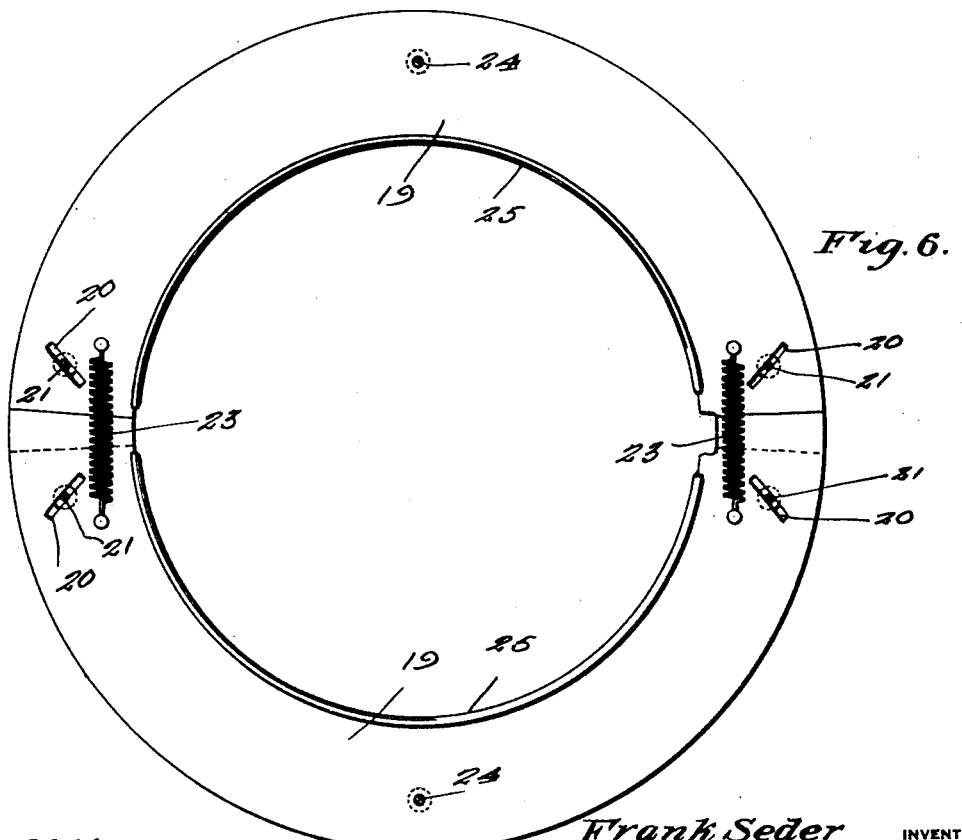
Frank Seder, INVENTOR

UNITED STATES PATENT OFFICE.

FRANK SEDER, OF SAN FRANCISCO, CALIFORNIA.

CUSPIDOR.

1,398,118.  Specification of Letters Patent.  Patented Nov. 22, 1921.

Application filed June 16, 1921. Serial No. 478,102.

*To all whom it may concern:*

Be it known that I, FRANK SEDER, a citizen of the United States, residing at San Francisco, in the county of San Francisco and State of California, have invented new and useful Improvements in Cuspidors, of which the following is a specification.

My present invention has reference to an improved cuspidor.
My object is to produce an article of this character in which a basin is let in a floor, the said basin having its bottom provided with an outlet leading to a sewer or the like and a spray inlet, while in the basin there is pivotally supported by spring influenced means, a bowl spaced from but held in one position in the basin by contact with the water inlet, the said basin being susceptible to swinging in the bowl to deliver the contents therefrom into the said bowl and both the bowl and basin being cleaned by the spray of fluid.

A further object is to produce a floor cuspidor in which a hinged basin is supported in a bowl that is let into a floor, said basin having an outlet at the bottom thereof and a water inlet adjacent to the top thereof which delivers into the bowl, the upper edges of both the bowl and basin being protected by flat segmental plates secured to the floor in such a manner that the inner peripheries thereof are normally disposed over the edges of the basin and bowl and the said protectors being susceptible to spreading away from the basin and bowl when contacted by the basin, during the swinging of the latter for emptying its contents into the basin.

The foregoing, and other objects which will appear as the nature of the invention is better understood, may be accomplished by a construction, combination and operative association of parts, such as is disclosed by the drawings which accompany and which form part of this specification In the drawings:—

Figure 1 is a perspective view of the improvement.

Fig. 2 is a substantially central vertical transverse sectional view through the same.

Fig. 3 is a sectional view taken at right angles to Fig. 2.

Fig. 4 is a sectional view on the line 4—4 of Fig. 1.
Fig. 5 is a sectional view on the line 5—5 of Fig. 1.

Fig. 6 is a bottom plan view of the segmental protector plates.

Fig. 7 is a view of the hooked rod employed for swinging the bowl to emptying position.

Through a floor 1 I make round openings at suitable determined points. In these openings, I arrange a saucer-like basin 2. The upper edge of the basin is preferably tacked, screwed or otherwise suitably connected to the wall provided by the opening. The basin 2, at the bottom thereof is centrally provided with an outlet which is surrounded by an interiorly threaded flange 3 in which is screwed a nipple 4 that is connected to a flexible or other outlet pipe 5 leading to a sewer or the like.

Below the floor surface 1 there is a water conducting pipe 6 that is connected by suitable couplings to a spray head or nozzle 7 arranged within and at one side of the basin 2. The passage of the nozzle is controlled by a valve 8 having an outstanding stem 9 influenced by a spring 10 to normally close the valve and consequently close the passage between the pipe 6 and the nozzle 7. The stem has on its outer end a head 11, the same being arranged a slight distance above the floor surface so that pressure by the foot of a person may be applied thereto to allow jets of water to flow through the spray head or nozzle 7. It is, of course, to be understood that the apertures in the face of the spray head or nozzle are so arranged that water therefrom will not be directed over the floor surface.

In the basin 2 there is a bowl 12. The bowl has outstanding trunnions 13 at the opposed sides thereof that pass through suitable bearing openings in the sides at the upper edge or rim of the basin 2 and are supported in suitable bearings 14 on the under face of the floor 1. The trunnions are influenced by springs 15 whereby to normally swing the basin to one position to cause a depressed surface in the rim of the bowl provided by a notch 16 to contact with the neck of the spray head or nozzle 7, and thus retain the rim of the bowl horizontally with respect to the floor surface.

The trunnions for the bowl are thus arranged right angularly with respect to the notch 16, and the inner surface of the bowl opposite the notch is provided with eye members 17 either of which being designed for engagement by the hooked end of a rod 18 upon which an upward and angular pull is exerted to swing the bowl on its trunnions against the influence of the springs 15 to dump the contents therefrom into the basin. Before and during this operation, the valve of the spray head or nozzle is operated to unseat the valve and permit of a flow of water being directed through the said spray head or nozzle into the bowl and therefrom into the basin. In this manner, the bowl is emptied and cleaned at one operation, and the cleaning of the bowl will also result in the cleaning of the basin.

In order to protect the upper edges or rims of both the bowl and basin, I arrange on the floor 1, two flat segmental plates 19 respectively. These plates have their ends in lapping relation and their inner edges projected over the rim of the bowl. The confronting ends of the segmental plates are provided with oppositely directed angularly disposed slots 20 respectively, and through these slots pass the shanks of headed elements 21. Let in depressions 22 in the floor surface are helical springs 23 that have their respective ends connected to the respective ends of the segmental plates 19. These springs draw upon the ends of the said plates so that the plates are retained in lapping relation and are held in proper position over the rim of the bowl 12. In addition to the headed elements 21, similar headed elements 24 pass through slots in the center of the segmental plates and enter the floor surface. The eyes 17 are arranged over the beaded edge of the bowl 12, and the inner edges of the segmental plates 24 are also beaded, as at 25. When the bowl is rocked to swinging position, the rounded eye members contacting with the beaded edges of the plates will cause the same to be moved away from each other, thus permitting the bowl to pass between the plates when the same is to be emptied. When the hooked rod is removed from engagement with the eyes, the springs will automatically return the bowl to its normal position, and it is believed that the foregoing description, when taken in connection with the drawings will fully set forth the construction and advantages of the improvement.

Having described the invention, I claim:—

A cuspidor including a basin let in an opening in a floor surface, having a central outlet, a water conducting pipe, a spray head therefor received in the basin, a valve controlling the passage between the pipe and spray head, an upstanding stem for the valve, spring means influencing the stem to hold the valve in closed position, a bowl in the basin having oppositely extending trunnions which are journaled in openings in the basin and on the bottom of the floor, spring means influencing the trunnions for holding the bowl in one position in the basin, said bowl having its rim notched to receive the neck of the spray head therein and the said bowl normally held in such position by said springs, eyes on the rim of the bowl opposite the notch, segmental protector plates arranged in lapping relation on the floor over the rim of the bowl, spring means normally retaining the protector plates in such relation, and said plates designed to have their edges contacted by the eyes on the bowl when the latter is swung in the basin to emptying position to move the said plates away from each other to permit of such swinging of said bowl.

In testimony whereof I affix my signature.

FRANK SEDER.